US012222011B2

(12) United States Patent
Katayama et al.

(10) Patent No.: US 12,222,011 B2
(45) Date of Patent: Feb. 11, 2025

(54) CLUTCH DEVICE

(71) Applicant: NSK-Warner K.K., Tokyo (JP)

(72) Inventors: Osamu Katayama, Fukuroi (JP); Takashi Kurita, Fukuroi (JP); Shiori Kokubo, Fukuroi (JP); Noboru Yaotani, Fukuroi (JP)

(73) Assignee: NSK-WARNER K.K., Tokyo (JP)

( * ) Notice: Subject to any disclaimer, the term of this patent is extended or adjusted under 35 U.S.C. 154(b) by 0 days.

(21) Appl. No.: 18/498,871

(22) Filed: Oct. 31, 2023

(65) Prior Publication Data

US 2024/0175471 A1 May 30, 2024

(30) Foreign Application Priority Data

Nov. 25, 2022 (JP) ................. 2022-187958

(51) Int. Cl.
| | |
|---|---|
| *F16D 41/12* | (2006.01) |
| *F16D 23/12* | (2006.01) |
| *F16D 41/14* | (2006.01) |

(52) U.S. Cl.
CPC ............ *F16D 41/12* (2013.01); *F16D 23/12* (2013.01); *F16D 41/14* (2013.01); *F16D 2023/123* (2013.01)

(58) Field of Classification Search
CPC .......... F16D 41/12; F16D 41/14; F16D 41/16; F16D 41/084; F16D 23/12; F16D 2023/123; F16D 23/14
See application file for complete search history.

(56) References Cited

U.S. PATENT DOCUMENTS

| | | | |
|---|---|---|---|
| 2006/0185957 A1* | 8/2006 | Kimes ................ | F16D 41/12 192/48.601 |
| 2017/0343061 A1* | 11/2017 | Campton ............ | F16D 41/16 |

(Continued)

FOREIGN PATENT DOCUMENTS

| | | |
|---|---|---|
| CN | 111120542 A | 5/2020 |
| JP | 50-106055 A | 8/1975 |

(Continued)

OTHER PUBLICATIONS

Extended European Search Report issued Apr. 17, 2024 in Application No. 23206874.2.

(Continued)

*Primary Examiner* — Richard M Lorence
(74) *Attorney, Agent, or Firm* — Sughrue Mion, PLLC (57) ABSTRACT

A clutch device includes an inner ring; an outer ring; a ratchet engagement mechanism; and a switching mechanism. When an engaging member is provided on an inner peripheral portion of the outer ring, a cam member includes a cam inner ring portion provided to rotate together with the inner ring, a cam outer ring portion disposed outside the cam inner ring portion, and a plurality of rolling elements disposed between the cam inner ring portion and the cam outer ring portion. When the engaging member is provided on an outer peripheral portion of the inner ring, the cam member includes a cam outer ring portion provided to rotate together with the outer ring, a cam inner ring portion disposed inside the cam outer ring portion, and a plurality of rolling elements disposed between the cam inner ring portion and the cam outer ring portion.

4 Claims, 12 Drawing Sheets

(56) References Cited

U.S. PATENT DOCUMENTS

2017/0356507 A1    12/2017  Trent et al.
2019/0264760 A1     8/2019  Peglowski et al.
2022/0082139 A1*    3/2022  Cioc ...................... F16D 41/16

FOREIGN PATENT DOCUMENTS

JP    2005-249115 A     9/2005
JP    2020-118250 A     8/2020
WO    2016/168020 A1   10/2016

OTHER PUBLICATIONS

Notice of Allowance issued Dec. 12, 2024 in EP Application No. 23206874.2.

* cited by examiner

CLUTCH DEVICE

TECHNICAL FIELD

One aspect of the present disclosure relates to a clutch device.

BACKGROUND

For example, in a clutch device described in Japanese Unexamined Patent Publication No. 2020-118250, an inner ring and an outer ring can be engaged with each other by a ratchet mechanism, and an engagement state of the ratchet mechanism can be switched by a switching mechanism including a cam member. The ratchet mechanism includes notches provided on an inner peripheral portion of the outer ring, and claw members provided on an outer peripheral portion of the inner ring. The cam member is provided to rotate together with the inner ring, and the engagement state of the claw members with respect to the notches is switched by causing the cam member to move in an axial direction and come into contact with the claw members.

SUMMARY

In the switchable ratchet type clutch device described above, it is necessary to provide both the cam member and the claw members on an inner ring side as in Japanese Unexamined Patent Publication No. 2020-118250 or to provide both the members on an outer ring side. The reason is that when one of the cam member and the claw members is provided on the inner ring side and the other is provided on the outer ring side, it is concerned that wear occurs between the cam member and the claw members due to a difference in rotation speed between the inner ring and the outer ring, and drag loss is increased. On the other hand, the switchable ratchet type clutch device is required to alleviate such design constraints and increase the degree of freedom in design.

An object of one aspect of the present disclosure is to provide a clutch device capable of increasing the degree of freedom in design while suppressing an increase in drag loss.

According to one aspect of the present disclosure, there is provided a clutch device including: [1] "an inner ring; an outer ring; a ratchet engagement mechanism including a notch provided on one of an outer peripheral portion of the inner ring and an inner peripheral portion of the outer ring, and an engaging member that is provided on the other of the outer peripheral portion of the inner ring and the inner peripheral portion of the outer ring and that engages with the notch to restrict a rotation between the inner ring and the outer ring in one direction; and a switching mechanism that includes a cam member movable in an axial direction with respect to the inner ring and the outer ring, and that switches an engagement state of the ratchet engagement mechanism between a first state where the engaging member is engaged with the notch and a second state where the engaging member is not engaged with the notch, by causing the cam member to move in the axial direction and come into contact with the engaging member. When the engaging member is provided on the inner peripheral portion of the outer ring, the cam member includes a cam inner ring portion provided to rotate together with the inner ring, a cam outer ring portion disposed outside the cam inner ring portion in a radial direction, and a plurality of rolling elements disposed between the cam inner ring portion and the cam outer ring portion, and the cam member moves in the axial direction to cause the cam outer ring portion to come into contact with the engaging member so as to switch the first state and the second state. When the engaging member is provided on the outer peripheral portion of the inner ring, the cam member includes a cam outer ring portion provided to rotate together with the outer ring, a cam inner ring portion disposed inside the cam outer ring portion in the radial direction, and a plurality of rolling elements disposed between the cam inner ring portion and the cam outer ring portion, and the cam member moves in the axial direction to cause the cam inner ring portion to come into contact with the engaging member so as to switch the first state and the second state."

In the clutch device, when the engaging member is provided on the inner peripheral portion of the outer ring, the cam member (cam inner ring portion) is provided to rotate together with the inner ring, and when the engaging member is provided on the outer peripheral portion of the inner ring, the cam member (cam outer ring portion) is provided to rotate together with the outer ring. Namely, one of the engaging member and the cam member is provided on an inner ring side, and the other is provided on an outer ring side. Accordingly, the degree of freedom in design can be increased. On the other hand, when such a configuration is adopted, as described above, wear may occur between the cam member and the engaging member due to a difference in rotation speed between the inner ring and the outer ring, so that drag loss can be increased. In this regard, in the clutch device, the cam member includes the cam inner ring portion, the cam outer ring portion, and the plurality of rolling elements, and has the function of a bearing. Accordingly, the occurrence of wear between the cam member and the engaging member can be suppressed, and an increase in drag loss can be suppressed. Therefore, according to the clutch device, it is possible to increase the degree of freedom in design while suppressing an increase in drag loss.

In the clutch device according to one aspect of the present disclosure "the notch may be provided on the outer peripheral portion of the inner ring, and the engaging member may be provided on the inner peripheral portion of the outer ring." In this case, since the cam member (cam inner ring portion) is provided on the inner ring side, space saving in the radial direction can be achieved.

In the clutch device according to one aspect of the present disclosure "the notch may be provided on the inner peripheral portion of the outer ring, and the engaging member may be provided on the outer peripheral portion of the inner ring." In this case, since the cam member (cam outer ring portion) is provided on the outer ring side, a space for disposing other components and the like can be secured inside the cam member in the radial direction.

In the clutch device according to one aspect of the present disclosure "when the engaging member is provided on the inner peripheral portion of the outer ring, the cam outer ring portion may consist of one member, and when the engaging member is provided on the outer peripheral portion of the inner ring, the cam inner ring portion may consist of one member." In this case, the number of components can be reduced, and cost reduction can be achieved. In addition, space saving in the axial direction can be achieved.

According to one aspect of the present disclosure, it is possible to provide the clutch device capable of increasing the degree of freedom in design while suppressing an increase in drag loss.

DETAILED DESCRIPTION

Hereinafter, embodiments of the present disclosure will be described in detail with reference to the drawings. In the following description, the same reference signs are used for the same or equivalent elements, and duplicate descriptions will be omitted.

First Embodiment

As shown in FIGS. 1 to 5, a clutch device 1A of a first embodiment includes an inner ring 2 and an outer ring 3. The outer ring 3 is disposed outside the inner ring 2 in a radial direction. Each of the inner ring 2 and the outer ring 3 is formed in an annular shape. The inner ring 2 and the outer ring 3 are disposed coaxially with each other, have a common rotation axis AX, and are rotatable relative to each other. Hereinafter, the outer ring 3 may be described as rotating with respect to the inner ring 2; however, rotation between the inner ring 2 and the outer ring 3 is relative to each other. In addition, a direction parallel to the rotation axis AX will be described as an axial direction, a direction perpendicular to the rotation axis AX will be described as the radial direction, and a direction along a circumference having the rotation axis AX as the center when viewed in the axial direction will be described as a circumferential direction.

The inner ring 2 is fitted to a shaft 11 at an inner peripheral portion of the inner ring 2, and rotates together with the shaft 11. In this example, a spline portion 2a is formed on the inner peripheral portion of the inner ring 2, and a spline portion 11a is formed on an outer peripheral portion of the shaft 11, and the inner ring 2 and the shaft 11 are coupled by fitting the spline portions 2a and 11a to each other. The spline portions 2a and 11a are composed of a combination of grooves and protrusions extending in the axial direction.

The outer ring 3 is fitted to a housing member 4 at an outer peripheral portion of the outer ring 3, and rotates together with the housing member 4. In this example, a spline portion 3a is formed on the outer peripheral portion of the outer ring 3, and a spline portion 4a is formed on an inner peripheral portion of the housing member 4, and the outer ring 3 and the housing member 4 are coupled by fitting the spline portions 3a and 4a to each other. The spline portions 3a and 4a are composed of a combination of grooves and protrusions extending in the axial direction.

The inner ring 2 and the outer ring 3 can be engaged with each other by a ratchet engagement mechanism 20. The ratchet engagement mechanism 20 includes a plurality of notches 21 provided on an outer peripheral portion of the inner ring 2, and a plurality of claw members 22 (engaging members) provided on an inner peripheral portion of the outer ring 3.

Figure 2:
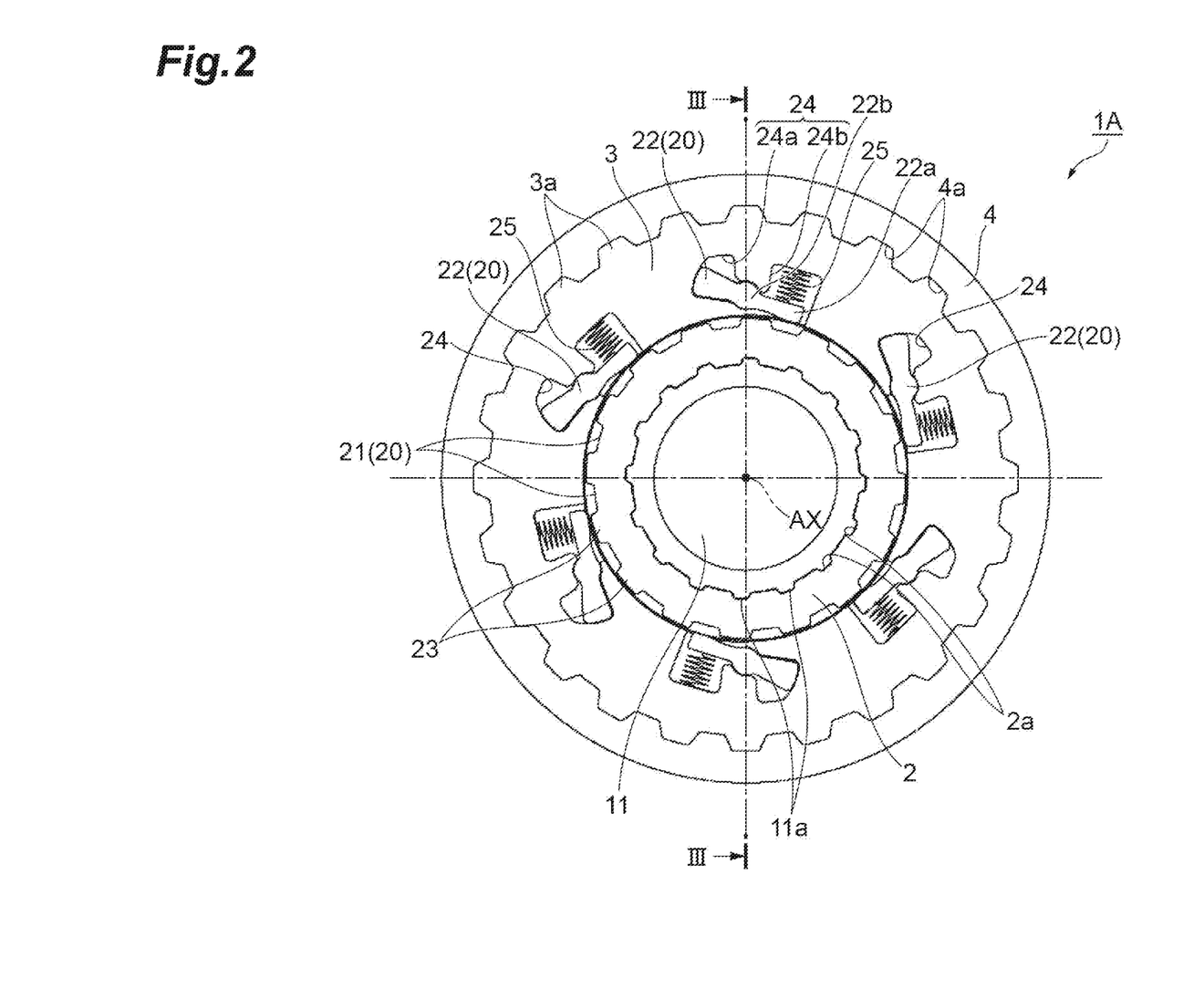
FIG. 2 is a front view of the clutch device of the first embodiment in a free state.
Figure 4:
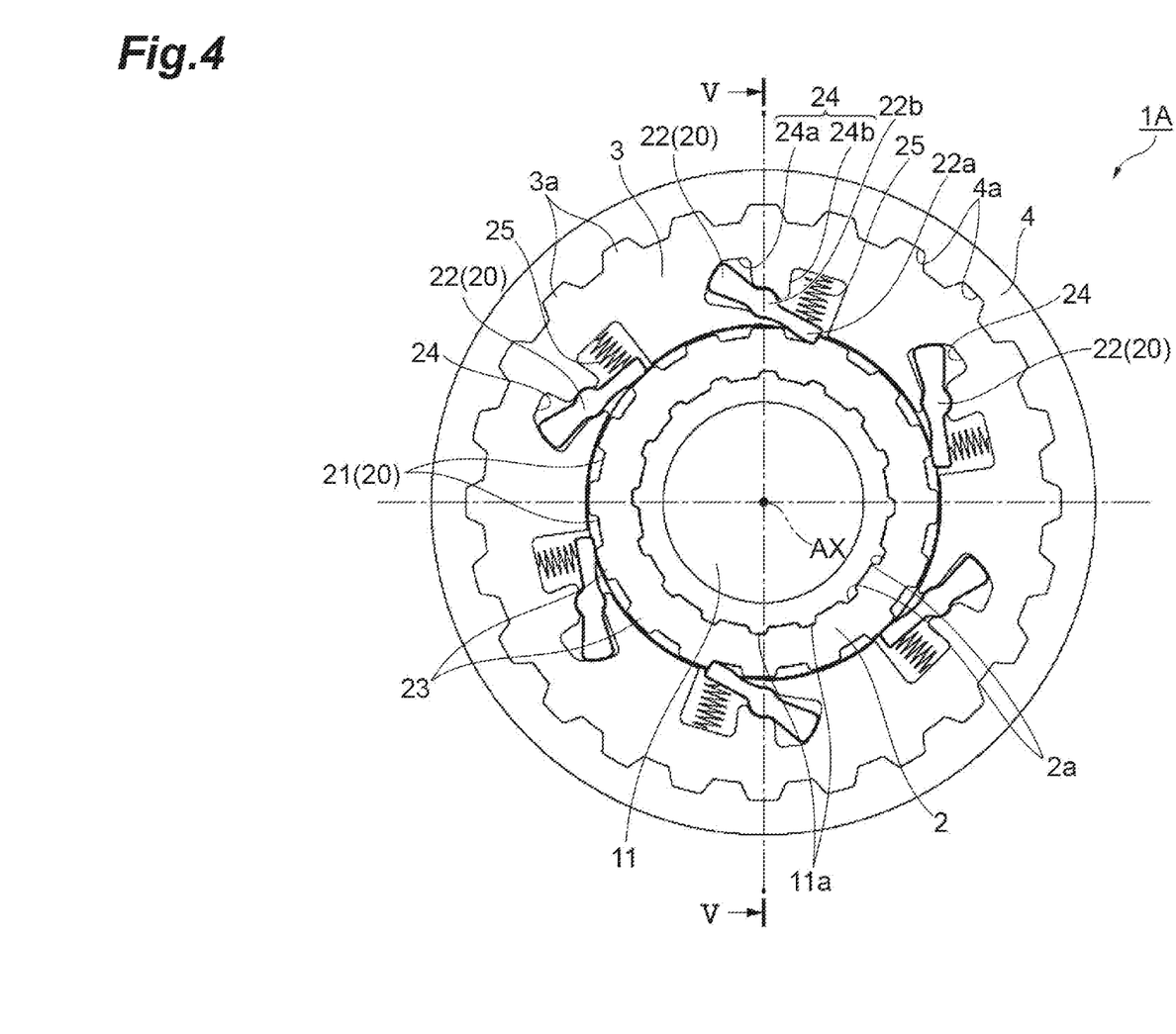
FIG. 4 is a front view of the clutch device of the first embodiment in a one-way state.

A plurality of tooth portions 23 protruding outward in the radial direction and extending in the axial direction are formed on the outer peripheral portion (outer peripheral surface) of the inner ring 2. The plurality of tooth portions 23 are provided over the entire circumference so as to be arranged at equal intervals along the circumferential direction. One notch 21 (groove) is formed by a space between the tooth portions 23 adjacent to each other in the circumferential direction. Therefore, the plurality of notches 21 are formed on the outer peripheral portion of the inner ring 2 so as to be arranged at equal intervals over the entire circumference in the circumferential direction.

Each of the claw members 22 includes a columnar portion 22b, and is supported by the outer ring 3 so as to be oscillatable about the columnar portion 22b in the radial direction (along a plane perpendicular to the axial direction). Specifically, the claw members 22 are disposed in a plurality of respective recesses 24 formed on the inner peripheral portion (inner peripheral surface) of the outer ring 3, so that the claw members 22 are oscillatable about the columnar portions 22b in the radial direction. Each of the recesses 24 is open on the inner peripheral surface of the outer ring 3. The plurality of recesses 24 are provided over the entire circumference so as to be arranged at equal intervals along the circumferential direction.

A biasing member 25 is further disposed in each of the recesses 24. Namely, the recess 24 includes a first portion 24a in which the claw member 22 is disposed, and a second portion 24b in which the biasing member 25 is disposed. The second portion 24b is connected to the first portion 24a. The biasing member 25 is, for example, a coil spring, and biases an end portion 22a of the claw member 22 inward (toward an inner ring 2 side) in the radial direction. The end portion 22a is one end of the claw member 22 in the circumferential direction, and functions as a claw portion that engages with the notch 21 as will be described later. The claw member 22 is disposed to be inclined such that the end portion 22a can protrude from the recess 24. In each of the recesses 24, the biasing member 25 is disposed in a compressed state between a bottom surface of the second portion 24b and the end portion 22a of the claw member 22.

Figure 1:
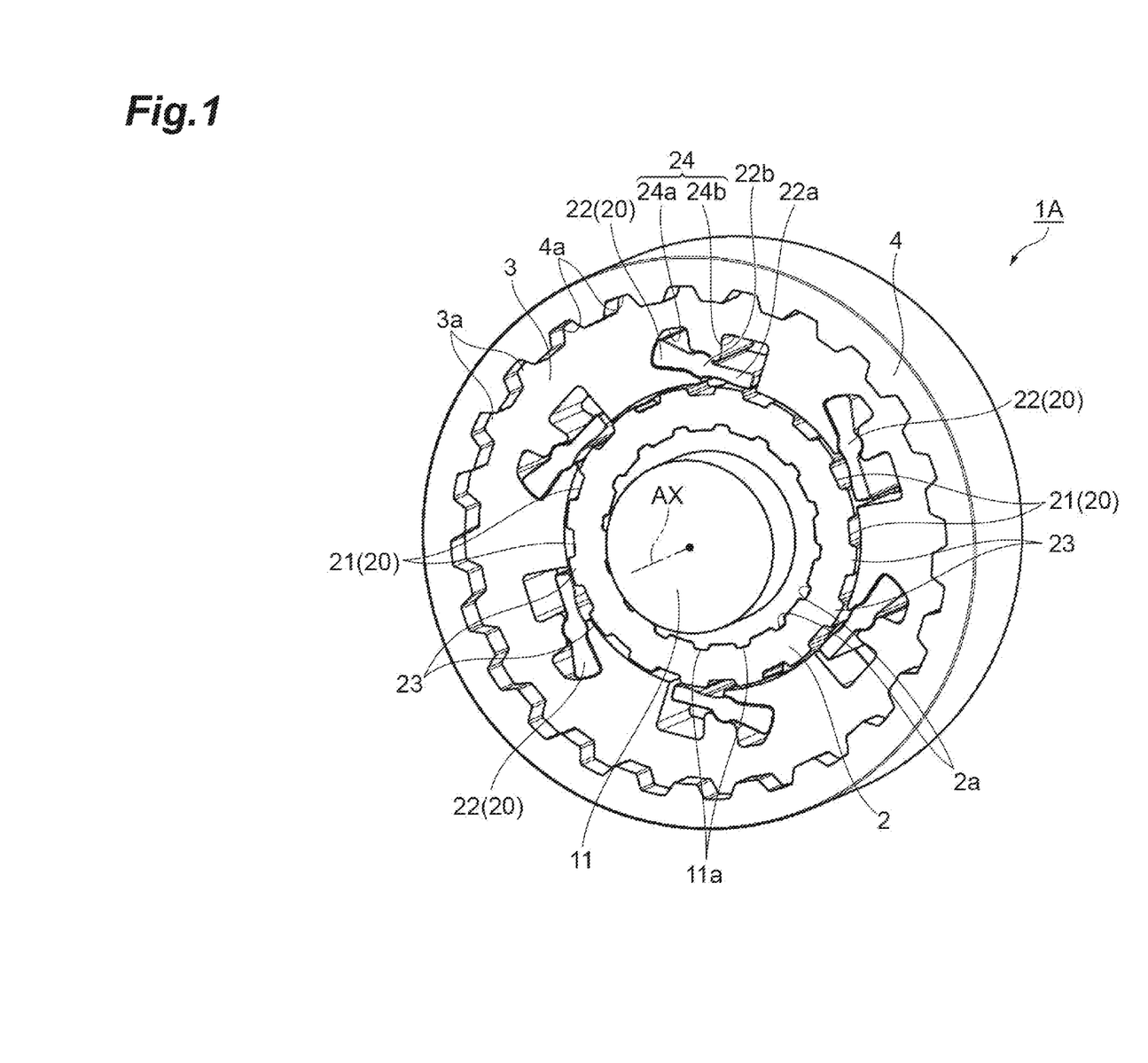
FIG. 1 is a perspective view of a clutch device of a first embodiment.
Figure 3:
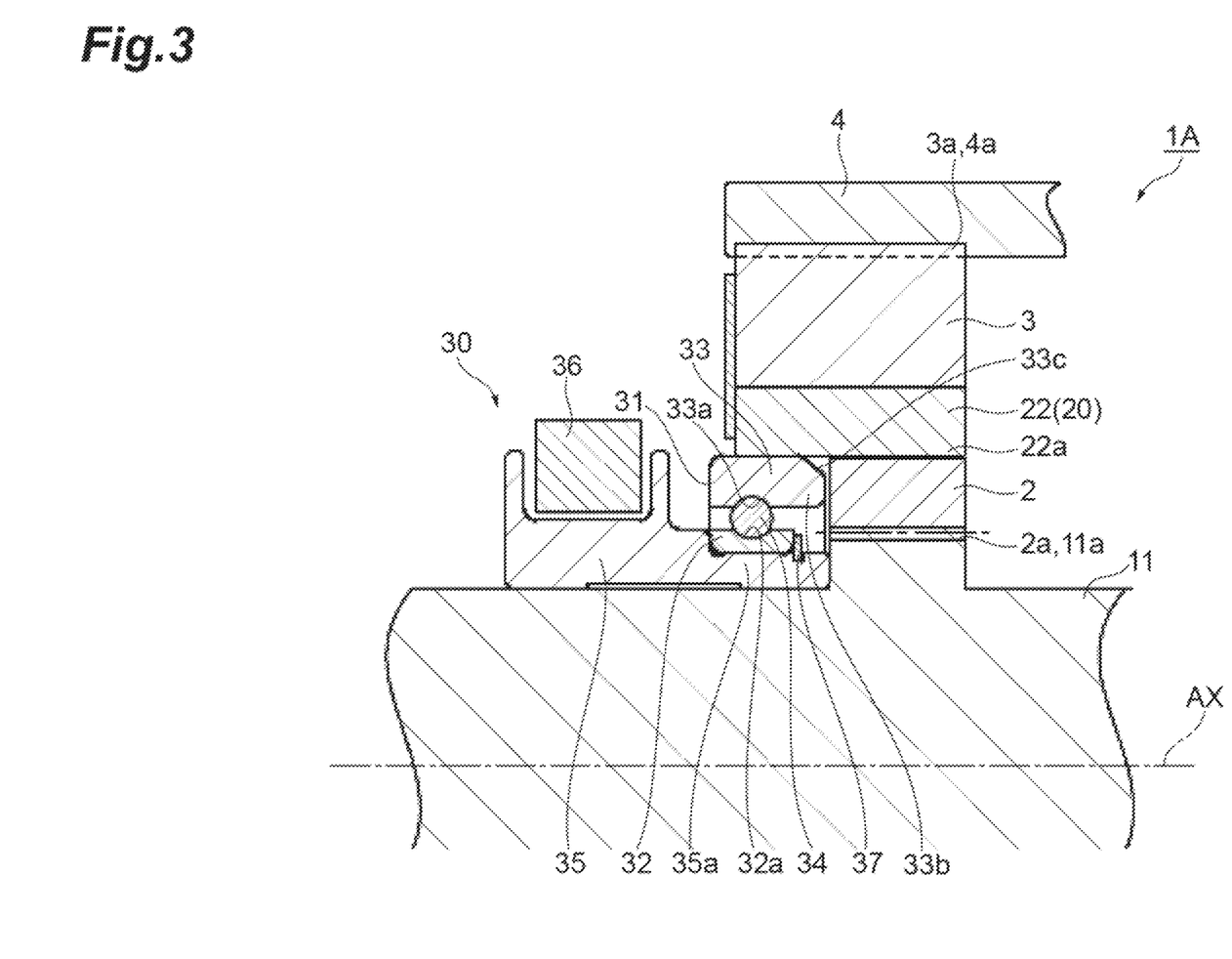
FIG. 3 is a cross-sectional view taken along line III-III of FIG. 2.

In the clutch device 1A, the engagement state between the inner ring 2 and the outer ring 3 by the ratchet engagement mechanism 20 can be switched by a switching mechanism 30. Namely, the clutch device 1A is a switchable ratchet type clutch device (selectable clutch). The switching mechanism 30 switches the engagement state by the ratchet engagement mechanism 20 between a one-way state (first state) (FIGS. 4 and 5) and a free state (second state) (FIGS. 1 to 3). Hatching indicating cross sections is shown in FIGS. 3, 5, 8 and 10 to 12.

In the one-way state, when the outer ring 3 rotates in one rotation direction (one direction) (clockwise direction in FIG. 4) with respect to the inner ring 2, the end portions 22a of the claw members 22 engage (mesh) with the notches 21, and the rotation of the outer ring 3 with respect to the inner ring 2 in the one rotation direction is locked (restricted). On the other hand, when the outer ring 3 rotates in the other rotation direction (opposite direction opposite to the one direction) (counterclockwise direction in FIG. 4) with respect to the inner ring 2 in the one-way state, the claw members 22 do not engage with the notches 21, and the rotation of the outer ring 3 with respect to the inner ring 2 in the other rotation direction is allowed (the outer ring 3 rotates freely). Namely, in the one-way state, torque is transmitted between the inner ring 2 and the outer ring 3 only when the outer ring 3 rotates in the one rotation direction with respect to the inner ring 2. In this example, torque is transmitted from the housing member 4 to the inner ring 2 (shaft 11) via the outer ring 3 and the claw members 22.

In the free state, regardless of whether the outer ring 3 rotates with respect to the inner ring 2 in the one rotation direction (clockwise direction in FIG. 2) or in the other rotation direction (counterclockwise direction in FIG. 2), the claw members 22 do not engage with the notches 21, and the rotation of the outer ring 3 with respect to the inner ring 2 in both the rotation directions is allowed. Namely, in the free state, regardless of whether the outer ring 3 rotates with respect to the inner ring 2 in the one rotation direction or in the other rotation direction, torque is not transmitted between the inner ring 2 and the outer ring 3.

Figure 5:
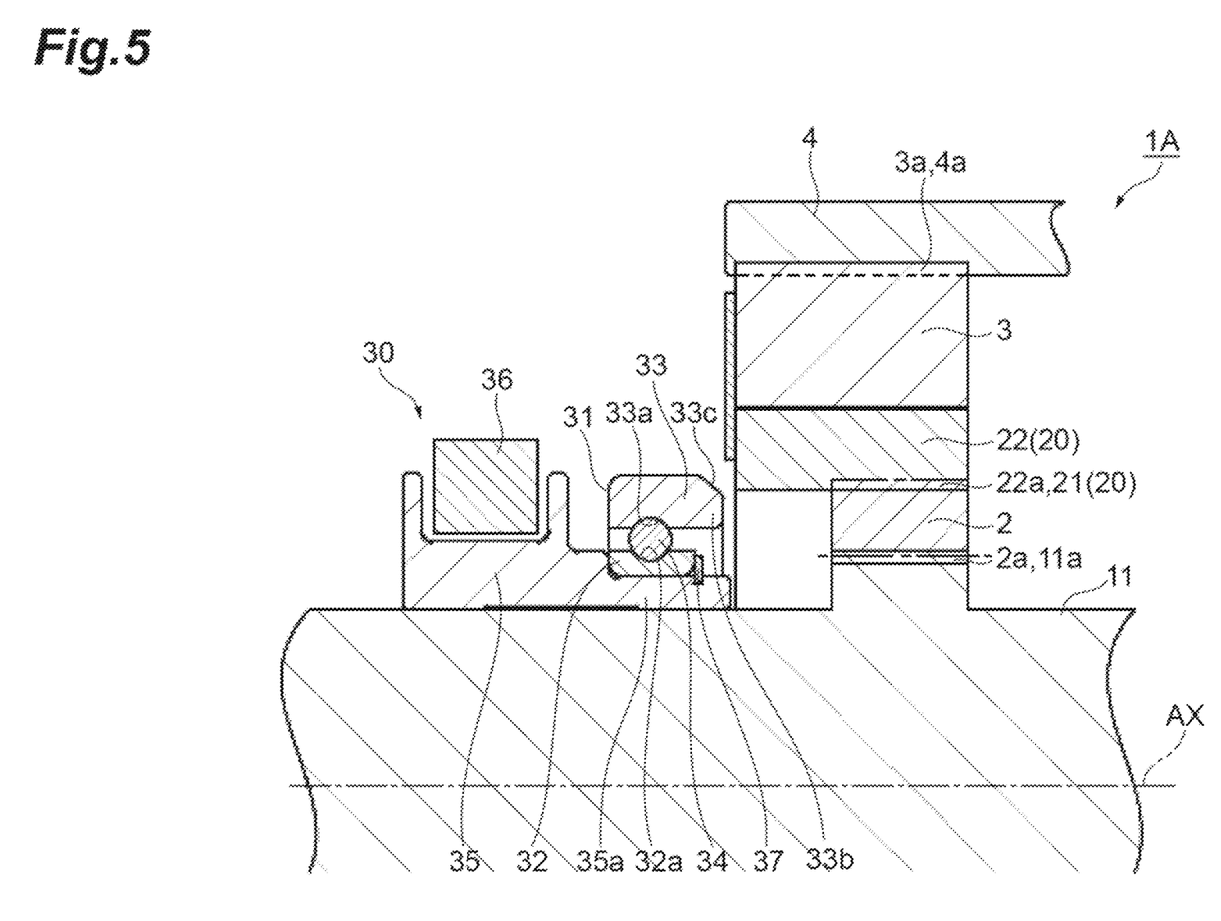
FIG. 5 is a cross-sectional view taken along line V-V of FIG. 4.
Figure 6:
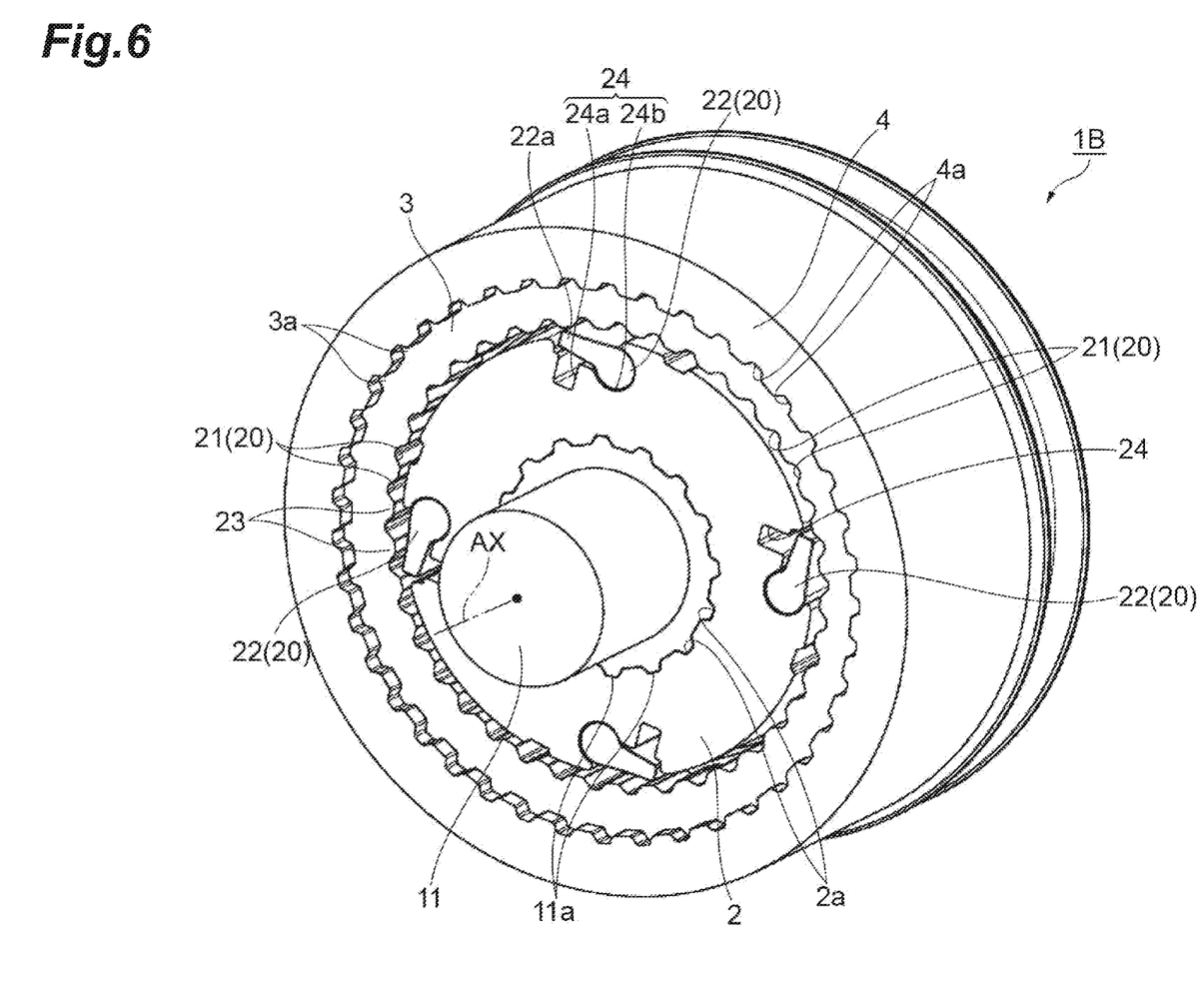
FIG. 6 is a perspective view of a clutch device of a second embodiment.

As shown in FIGS. 3 and 5, the switching mechanism 30 includes a cam member 31 (switching cam) that is movable in the axial direction with respect to the inner ring 2 and the outer ring 3, and switches the engagement state of the ratchet engagement mechanism 20 between the one-way state and the free state by causing the cam member 31 to move in the axial direction and come into contact with the claw members 22. The cam member 31 is configured as a cam bearing having the function of a bearing, and includes a cam inner ring portion 32, a cam outer ring portion 33, and a plurality of rolling elements 34. In this example, the rolling elements 34 are balls. Each of the cam inner ring portion 32 and the cam outer ring portion 33 is formed in an annular shape. The cam inner ring portion 32 and the cam outer ring portion 33 are disposed coaxially with the inner ring 2 and the outer ring 3, and have the rotation axis AX common to the inner ring 2 and the outer ring 3. Each of the cam inner ring portion 32 and the cam outer ring portion 33 is composed of one member.

The cam inner ring portion 32 has a raceway surface 32a facing outward in the radial direction. The raceway surface 32a is formed in a shape corresponding to the rolling elements 34. The cam inner ring portion 32 is attached to the shaft 11 via a support member 35, and rotates together with the inner ring 2 (in synchronization with the inner ring 2). The support member 35 is an annular member that is attached to the shaft 11 so as to be movable in the axial direction, and is moved in the axial direction by the driving force of an actuator 36. The cam inner ring portion 32 is fitted to an end portion 35a of the support member 35 at an inner peripheral portion of the cam inner ring portion 32. The end portion 35a is an end portion (end portion on the inner ring 2 side) of the support member 35 in the axial direction. In this example, a retaining ring 37 is provided on the inner ring 2 side of the cam inner ring portion 32, and the cam inner ring portion 32 is disposed between the support member 35 and the retaining ring 37, so that the movement of the cam inner ring portion 32 in the axial direction is restricted.

The cam outer ring portion 33 is disposed outside the cam inner ring portion 32 in the radial direction. The cam outer ring portion 33 has a raceway surface 33a facing inward in the radial direction. The raceway surface 33a is formed in a shape corresponding to the rolling elements 34. The cam outer ring portion 33 includes a protruding portion 33b protruding with respect to the cam inner ring portion 32 in the axial direction (located on the inner ring 2 side). An inclined surface 33c inclined with respect to the axial direction is formed over the entire circumference of an outer peripheral portion of the protruding portion 33b. The inclined surface 33c is formed over the entirety of the protruding portion 33b in the axial direction. The inclined surface 33c comes into contact with the claw members 22 as will be described later. In such a manner, a length of the cam outer ring portion 33 in the axial direction is longer than a length of the cam inner ring portion 32 in the axial direction. In addition, a thickness of the cam outer ring portion 33 in the radial direction is thicker than a thickness of the cam inner ring portion 32 in the radial direction. Note that the length of the cam outer ring portion 33 in the axial direction may be equal to or less than the length of the cam inner ring portion 32 in the axial direction, and the thickness of the cam outer ring portion 33 in the radial direction may be equal to or less than the thickness of the cam inner ring portion 32 in the radial direction.

The plurality of rolling elements 34 are disposed between the raceway surface 32a of the cam inner ring portion 32 and the raceway surface 33a of the cam outer ring portion 33. The plurality of rolling elements 34 are rollably held by a retainer (not shown), and are disposed side by side at predetermined intervals along the circumferential direction.

In the free state shown in FIGS. 1 to 3, the cam outer ring portion 33 comes into contact with the end portions 22a of the claw members 22 at an outer peripheral portion of the cam outer ring portion 33. Accordingly, the end portions 22a are lifted (moved outward in the radial direction) to compress the biasing members 25, and the end portions 22a are located at positions where the end portions 22a do not engage with the notches 21. As a result, as described above, regardless of whether the outer ring 3 rotates with respect to the inner ring 2 in the one rotation direction or in the other rotation direction, the claw members 22 do not engage with the notches 21, and the rotation of the outer ring 3 with respect to the inner ring 2 in both the rotation directions is allowed. In the free state, when there is a difference in rotation speed between the inner ring 2 and the outer ring 3, there also occurs a difference in rotation speed between the cam inner ring portion 32 rotating in synchronization with the inner ring 2 and the claw members 22 rotating in synchronization with the outer ring 3; however, the difference in rotation speed is absorbed by the rotation of the cam outer ring portion 33 in contact with the claw members 22 with respect to the cam inner ring portion 32.

When the cam member 31 (cam inner ring portion 32) moves away from the inner ring 2 and the outer ring 3 in the axial direction from the free state, the cam outer ring portion 33 separates from the end portions 22a of the claw members 22, so that the one-way state shown in FIGS. 4 and 5 is reached. In the one-way state, the biasing force of the biasing members 25 locates the end portions 22a at positions where the end portions 22a engage with the notches 21. As a result, as described above, when the outer ring 3 rotates with respect to the inner ring 2 in the one rotation direction, the end portions 22a engage with the notches 21, and the rotation of the outer ring 3 with respect to the inner ring 2 in the one rotation direction is locked. When the cam member 31 (cam inner ring portion 32) moves toward the inner ring 2 and the outer ring 3 in the axial direction from the one-way state, and the cam outer ring portion 33 comes into contact with the end portions 22a at the outer peripheral portion, the free state is reached. At this time, the cam outer ring portion 33 first comes into contact with the end portions 22a at the inclined surface 33c, and then comes into contact with the end portions 22a at the outer peripheral portion. Accordingly, the end portions 22a of the claw members 22 can be suitably moved outward in the radial direction by the cam outer ring portion 33.

Second Embodiment

In a clutch device 1B of a second embodiment shown in FIGS. 6 to 10, the notches 21 are provided on the inner peripheral portion of the outer ring 3, and the claw members 22 are provided on the outer peripheral portion of the inner ring 2. Therefore, the tooth portions 23 constituting the notches 21 are also provided on the inner peripheral portion of the outer ring 3, and the recesses 24 in which the claw members 22 are disposed are also provided on the outer peripheral portion of the inner ring 2. The biasing members 25 bias the end portions 22a of the claw members 22 outward (toward an outer ring 3 side) in the radial direction.

The clutch device 1B includes a cam member 41 instead of the cam member 31. The cam member 41 is configured as a cam bearing having the function of a bearing, and includes a cam outer ring portion 42, a cam inner ring portion 43, and a plurality of the rolling elements 34. Each of the cam outer ring portion 42 and the cam inner ring portion 43 is formed in an annular shape. The cam outer ring portion 42 and the cam inner ring portion 43 are disposed coaxially with the inner ring 2 and the outer ring 3, and have the rotation axis AX common to the inner ring 2 and the outer ring 3. Each of the cam outer ring portion 42 and the cam inner ring portion 43 is composed of one member.

Figure 8:
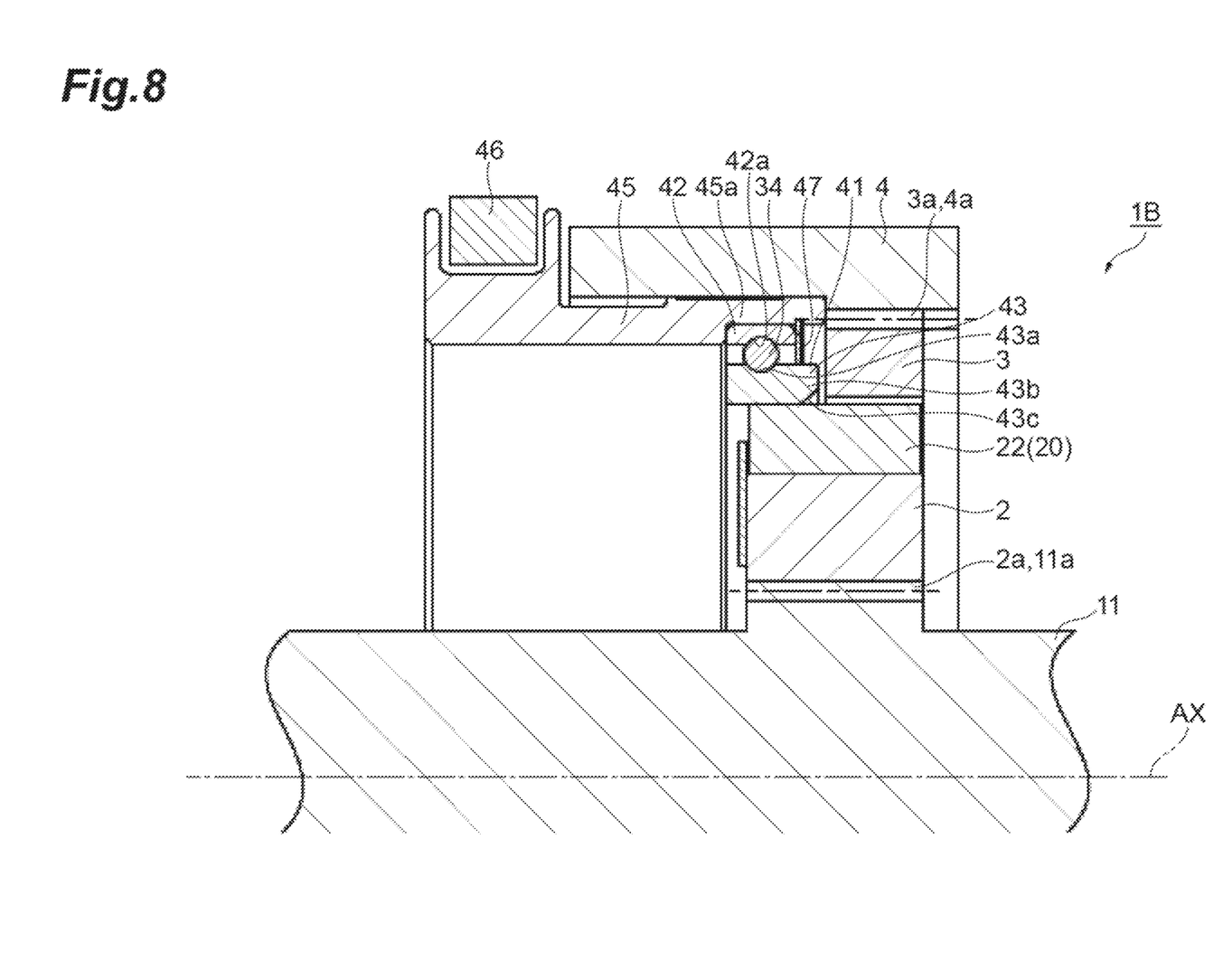
FIG. 8 is a cross-sectional view taken along line VIII-VIII of FIG. 7.
Figure 10:
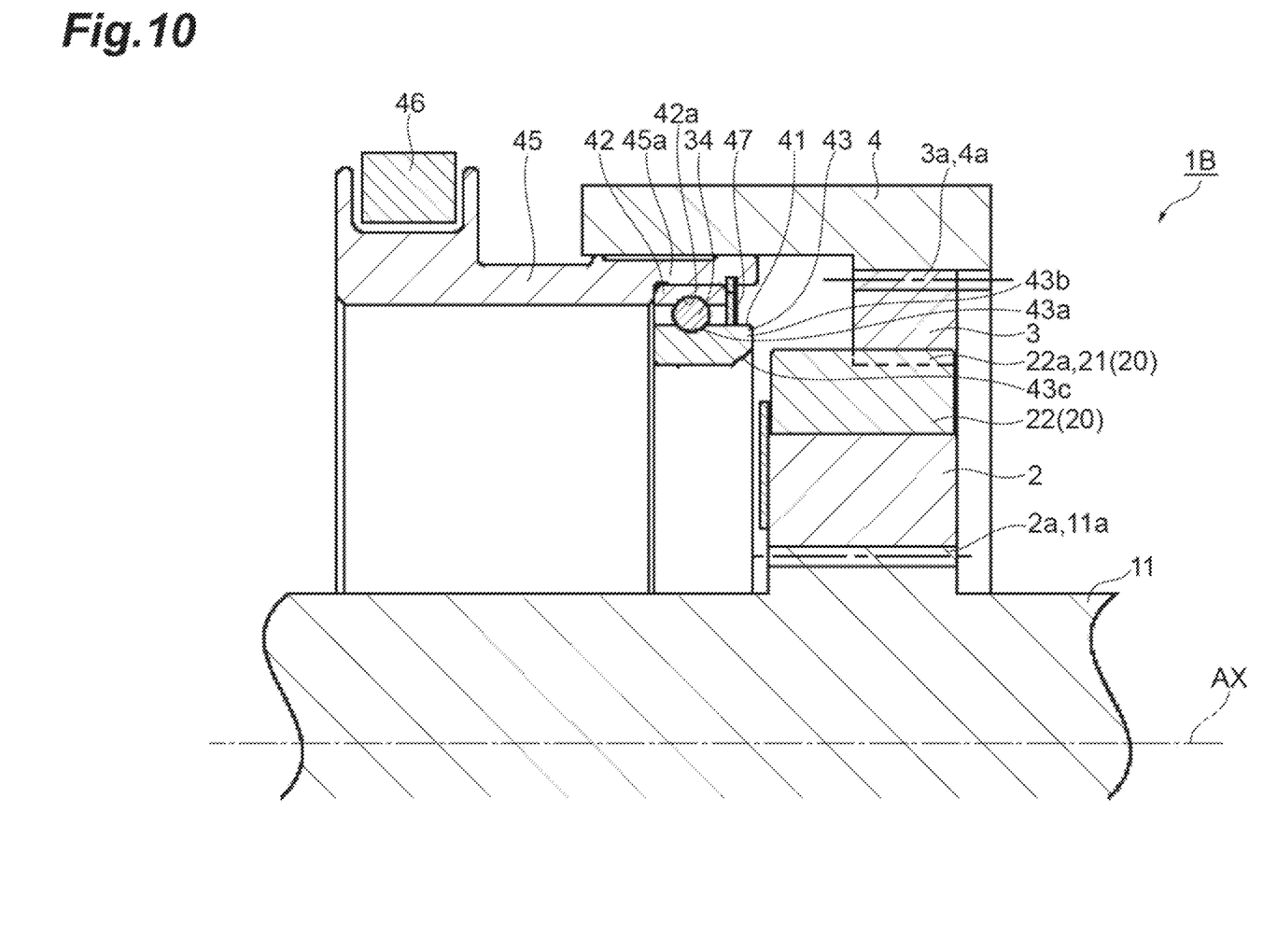
FIG. 10 is a cross-sectional view taken along line X-X of FIG. 9.

The cam outer ring portion 42 has a raceway surface 42a facing inward in the radial direction. The raceway surface 42a is formed in a shape corresponding to the rolling elements 34. The cam outer ring portion 42 is attached to the housing member 4 via a support member 45, and rotates together with the outer ring 3 (in synchronization with the outer ring 3). The support member 45 is an annular member that is attached to the housing member 4 so as to be movable in the axial direction, and is moved in the axial direction by the driving force of an actuator 46. The cam outer ring portion 42 is fitted to an end portion 45a of the support member 45 at an outer peripheral portion of the cam outer ring portion 42. The end portion 45a is an end portion (end portion on the outer ring 3 side) of the support member 45 in the axial direction. In this example, a retaining ring 47 is provided on the outer ring 3 side of the cam outer ring portion 42, and the cam outer ring portion 42 is disposed between the support member 45 and the retaining ring 47, so that the movement of the cam outer ring portion 42 in the axial direction is restricted.

The cam inner ring portion 43 is disposed inside the cam outer ring portion 42 in the radial direction. The cam inner ring portion 43 has a raceway surface 43a facing outward in the radial direction. The raceway surface 43a is formed in a shape corresponding to the rolling elements 34. The cam inner ring portion 43 includes a protruding portion 43b protruding with respect to the cam outer ring portion 42 in the axial direction (located on the outer ring 3 side). An inclined surface 43c inclined with respect to the axial direction is formed over the entire circumference of an inner peripheral portion of the protruding portion 43b. The inclined surface 43c is formed over the entirety of the protruding portion 43b in the axial direction. The inclined surface 43c comes into contact with the claw members 22 as will be described later. In such a manner, a length of the cam inner ring portion 43 in the axial direction is longer than a length of the cam outer ring portion 42 in the axial direction. In addition, a thickness of the cam inner ring portion 43 in the radial direction is thicker than a thickness of the cam outer ring portion 42 in the radial direction. Note that the length of the cam inner ring portion 43 in the axial direction may be equal to or less than the length of the cam outer ring portion 42 in the axial direction, and the thickness of the cam inner ring portion 43 in the radial direction may be equal to or less than the thickness of the cam outer ring portion 42 in the radial direction.

Figure 7:
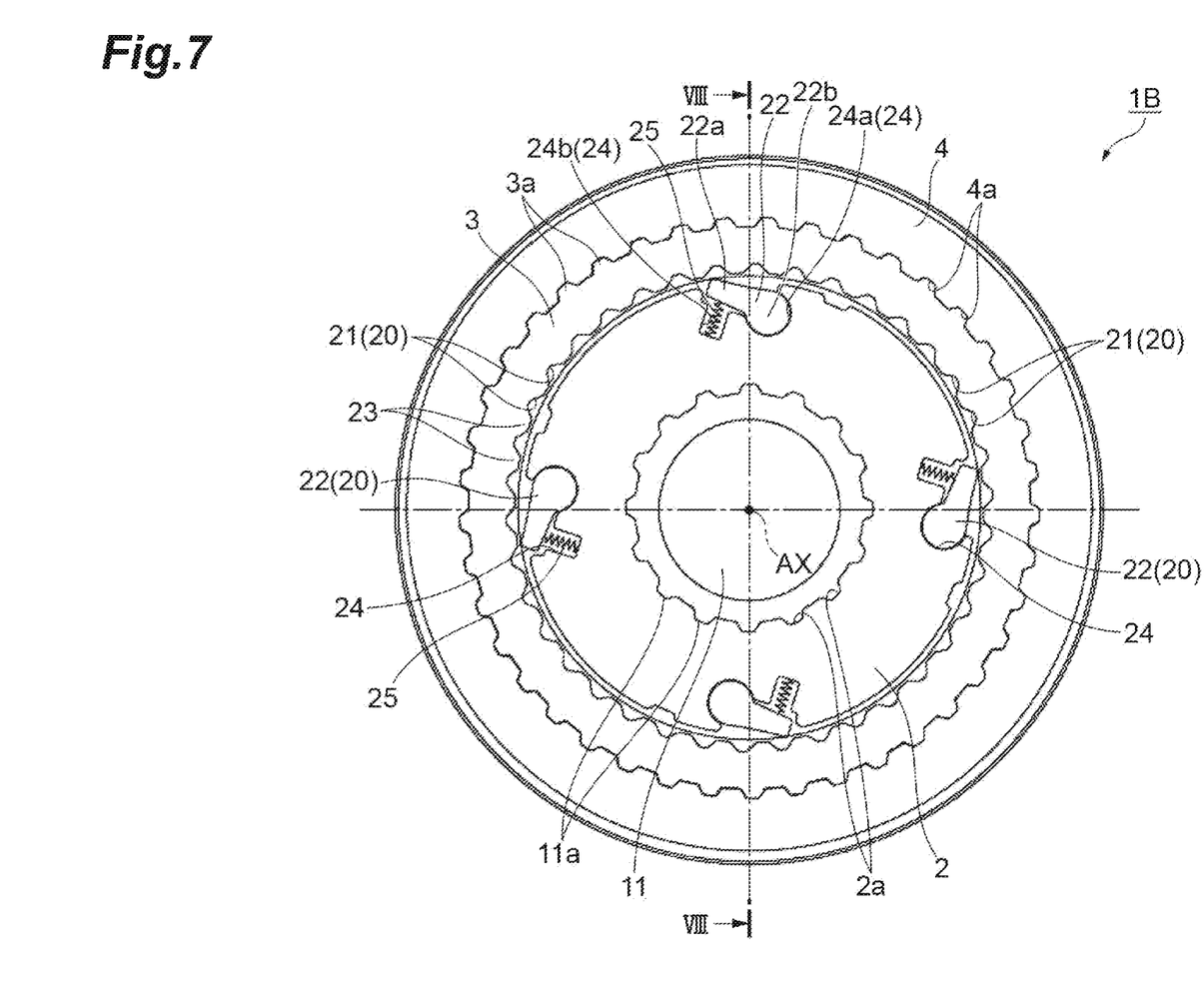
FIG. 7 is a front view of the clutch device of the second embodiment in the free state.

In the free state shown in FIGS. 7 and 8, the cam inner ring portion 43 comes into contact with the end portions 22a of the claw members 22 at an inner peripheral portion of the cam inner ring portion 43. Accordingly, the end portions 22a are pushed down (moved inward in the radial direction) to compress the biasing members 25, and the end portions 22a are located at positions where the end portions 22a do not engage with the notches 21. As a result, regardless of whether the outer ring 3 rotates with respect to the inner ring 2 in the one rotation direction or in the other rotation direction, the claw members 22 do not engage with the notches 21, and the rotation of the outer ring 3 with respect to the inner ring 2 in both the rotation directions is allowed. In the free state, when there is a difference in rotation speed between the inner ring 2 and the outer ring 3, there also occurs a difference in rotation speed between the cam outer ring portion 42 rotating in synchronization with the outer ring 3 and the claw members 22 rotating in synchronization with the inner ring 2; however, the difference in rotation speed is absorbed by the rotation of the cam inner ring portion 43 in contact with the claw members 22 with respect to the cam outer ring portion 42.

Figure 9:
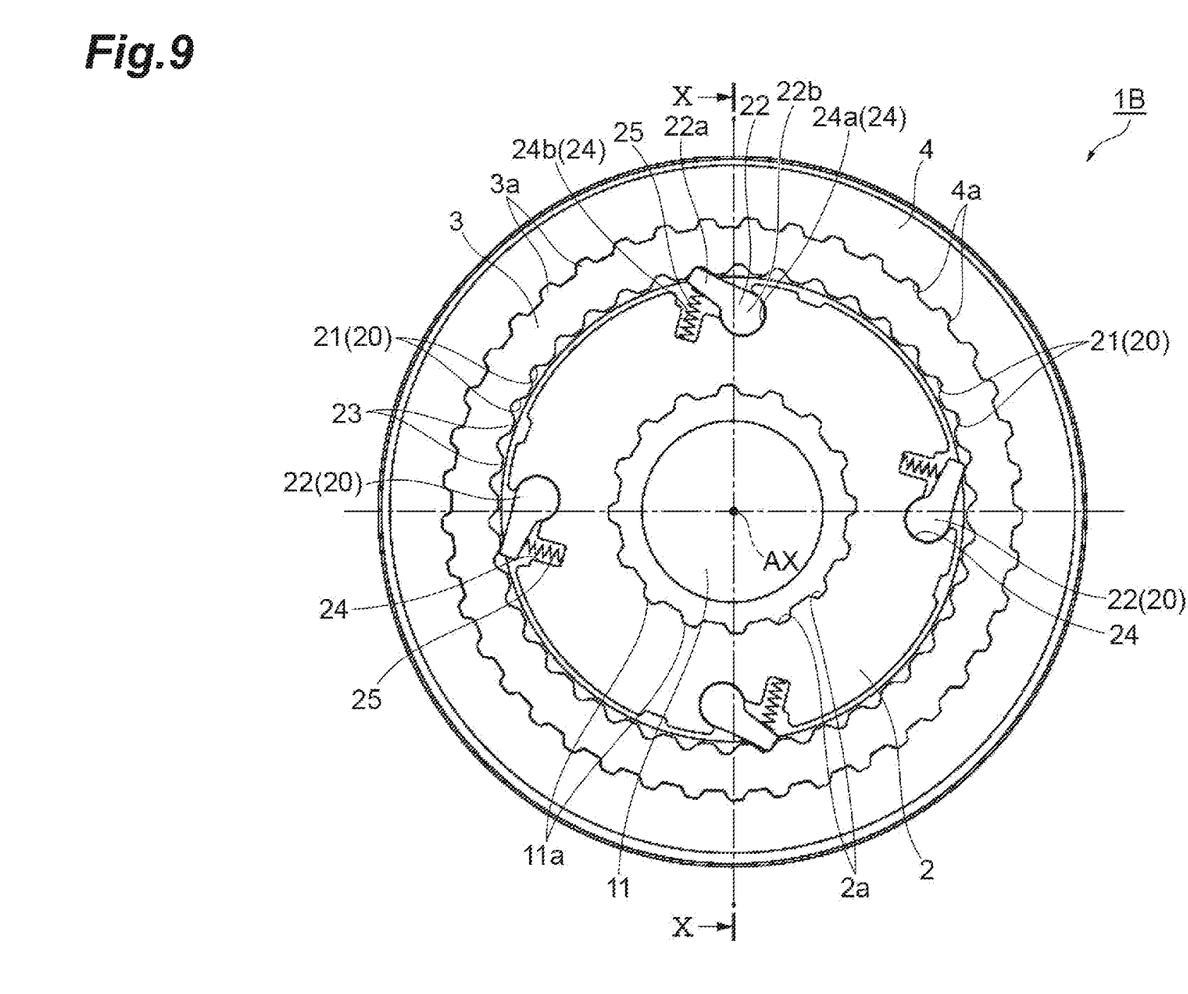
FIG. 9 is a front view of the clutch device of the second embodiment in the one-way state.

When the cam member 41 (cam outer ring portion 42) moves away from the inner ring 2 and the outer ring 3 in the axial direction from the free state, the cam inner ring portion 43 separates from the end portions 22a of the claw members 22, so that the one-way state shown in FIGS. 9 and 10 is reached. In the one-way state, the biasing force of the biasing members 25 locates the end portions 22a at positions where the end portions 22a engage with the notches 21. As a result, when the outer ring 3 rotates with respect to the inner ring 2 in the one rotation direction, the end portions 22a engage with the notches 21, and the rotation of the outer ring 3 with respect to the inner ring 2 in the one rotation direction is locked. When the cam member 41 (cam outer ring portion 42) moves toward the inner ring 2 and the outer ring 3 in the axial direction from the one-way state, and the cam inner ring portion 43 comes into contact with the end portions 22a at the inner peripheral portion, the free state is reached. At this time, the cam inner ring portion 43 first comes into contact with the end portions 22a at the inclined surface 43c, and then comes into contact with the end portions 22a at the inner peripheral portion. Accordingly, the end portions 22a of the claw members 22 can be suitably moved inward in the radial direction by the cam inner ring portion 43.

Functions and Effects

In the clutch devices 1A and 1B, when the claw members 22 (engaging members) are provided on the inner peripheral portion of the outer ring 3 (clutch device 1A), the cam member 31 (cam inner ring portion 32) is provided to rotate together with the inner ring 2, and when the claw members 22 are provided on the outer peripheral portion of the inner ring 2 (clutch device 1B), the cam member 41 (cam outer ring portion 42) is provided to rotate together with the outer ring 3. Namely, one of the claw members 22 and the cam members 31 and 41 is provided on the inner ring 2 side, and the other is provided on the outer ring 3 side. Accordingly, the degree of freedom in design can be increased. On the other hand, when such a configuration is adopted, wear may occur between the cam members 31 and 41 and the claw members 22 due to a difference in rotation speed between the inner ring 2 and the outer ring 3, so that drag loss can be increased. In this regard, in the clutch devices 1A and 1B, the cam member 31 (41) includes the cam inner ring portion 32 (43), the cam outer ring portion 33 (42), and the plurality of rolling elements 34, and has the function of a bearing. Accordingly, the occurrence of wear between the cam members 31 and 41 and the claw members 22 can be suppressed, and an increase in drag loss can be suppressed. Therefore, according to the clutch devices 1A and 1B, it is possible to increase the degree of freedom in design while suppressing an increase in drag loss.

In the clutch device 1A, the notches 21 are provided on the outer peripheral portion of the inner ring 2, and the claw members 22 are provided on the inner peripheral portion of the outer ring 3. In this case, since the cam member 31 (cam inner ring portion 32) is provided on the inner ring 2 side, space saving in the radial direction can be achieved. For example, unlike the clutch device 1A, in a case where the cam member is composed of an integral member not having the function of a bearing, when the claw members 22 are provided on the inner peripheral portion of the outer ring 3, as described above, in order to avoid the occurrence of wear between the cam member and the claw members 22, both the cam member and the claw members 22 need to be provided on the outer ring 3 side. In this case, for example, the cam member is spline-coupled with an outer peripheral portion of the housing member 4, so that the size is increased in the radial direction. In contrast, in the clutch device 1A, since the cam member 31 having the function of a bearing is provided on the inner ring 2 side, space saving in the radial direction can be achieved. In addition, since a spline for coupling with the cam member does not need to be formed on the housing member 4, cost reduction can be achieved.

In the clutch device 1B, the notches 21 are provided on the inner peripheral portion of the outer ring 3, and the claw members 22 are provided on the outer peripheral portion of the inner ring 2. In this case, since the cam member 41 (cam outer ring portion 42) is provided on the outer ring 3 side, a space for disposing other components and the like can be secured inside the cam member 41 in the radial direction.

In the clutch device 1A, the cam outer ring portion 33 is composed of one member, and in the clutch device 1B, the cam inner ring portion 43 is composed of one member. In this case, compared to when the cam outer ring portion 33 or the cam inner ring portion 43 is composed of a plurality of members, the number of components can be reduced, and cost reduction can be achieved. In addition, space saving in the axial direction can be achieved. For example, when a comparative example is a case where the cam outer ring portion 33 includes an inner member having the raceway surface 33a and an outer member that comes into contact with the claw members 22 (for example, a first modification example to be described later), in the clutch device 1A, the number of components can be reduced compared to the comparative example. In addition, in the comparative example, a retaining ring for fixing the outer member to the inner member is required; however, when the cam outer ring portion 33 is composed of one member, such a retaining ring can be omitted. In addition, in the comparative example, the outer member protrudes with respect to the inner member in the axial direction, so that the size is increased, which is a risk; however, when the cam outer ring portion 33 is composed of one member, such a risk does not occur, and space saving in the axial direction can be achieved.

The present disclosure is not limited to the above embodiments. For example, the material and shape of each configuration are not limited to the material and shape described above, and various materials and shapes can be adopted. The rolling elements 34 are not limited to balls, and may be rollers or the like.

Figure 11:
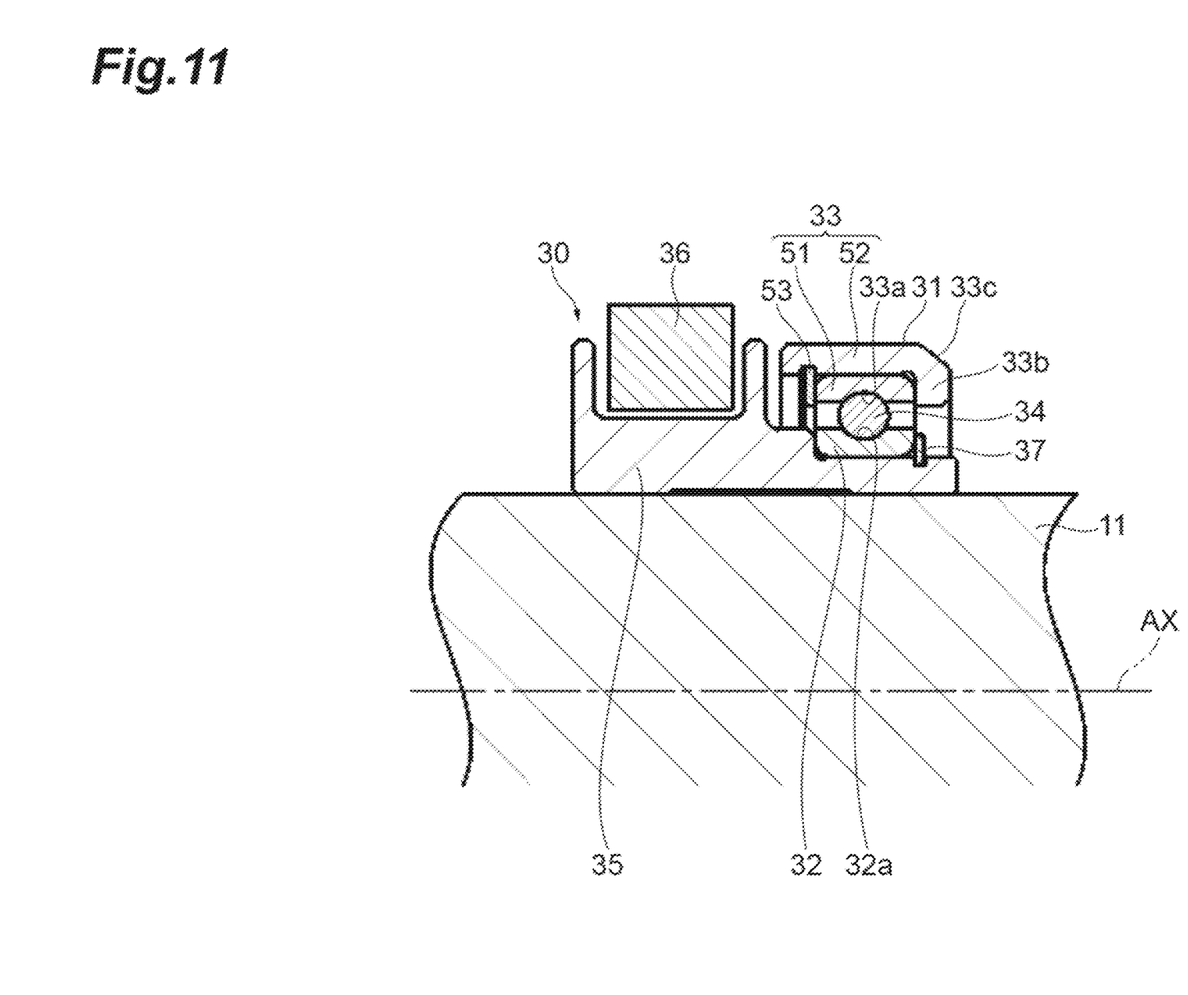
FIG. 11 is a cross-sectional view of a cam member of a first modification example.

The first modification example shown in FIG. 11 is a modification example of the cam member 31 in the clutch device 1A of the first embodiment. In the first modification example, the cam outer ring portion 33 includes an inner member 51 having the raceway surface 33a, and an outer member 52 disposed outside the inner member 51 in the radial direction to come into contact with the claw members 22. The outer member 52 includes the protruding portion 33b on which the inclined surface 33c is formed, and comes into contact with the claw members 22 at the inclined surface 33c. The inner member 51 is a member constituting a bearing together with the cam inner ring portion 32, and the outer member 52 is a cam ring that lifts the claw members 22. In this example, a retaining ring 53 is provided opposite to the inner ring 2 of the inner member 51, and the inner member 51 is disposed between the outer member 52 and the retaining ring 53, so that the movement of the inner member 51 in the axial direction is restricted. Even in the case of using the cam member 31 of the first modification example, similarly to the first embodiment, it is possible to increase the degree of freedom in design while suppressing an increase in drag loss.

Figure 12:
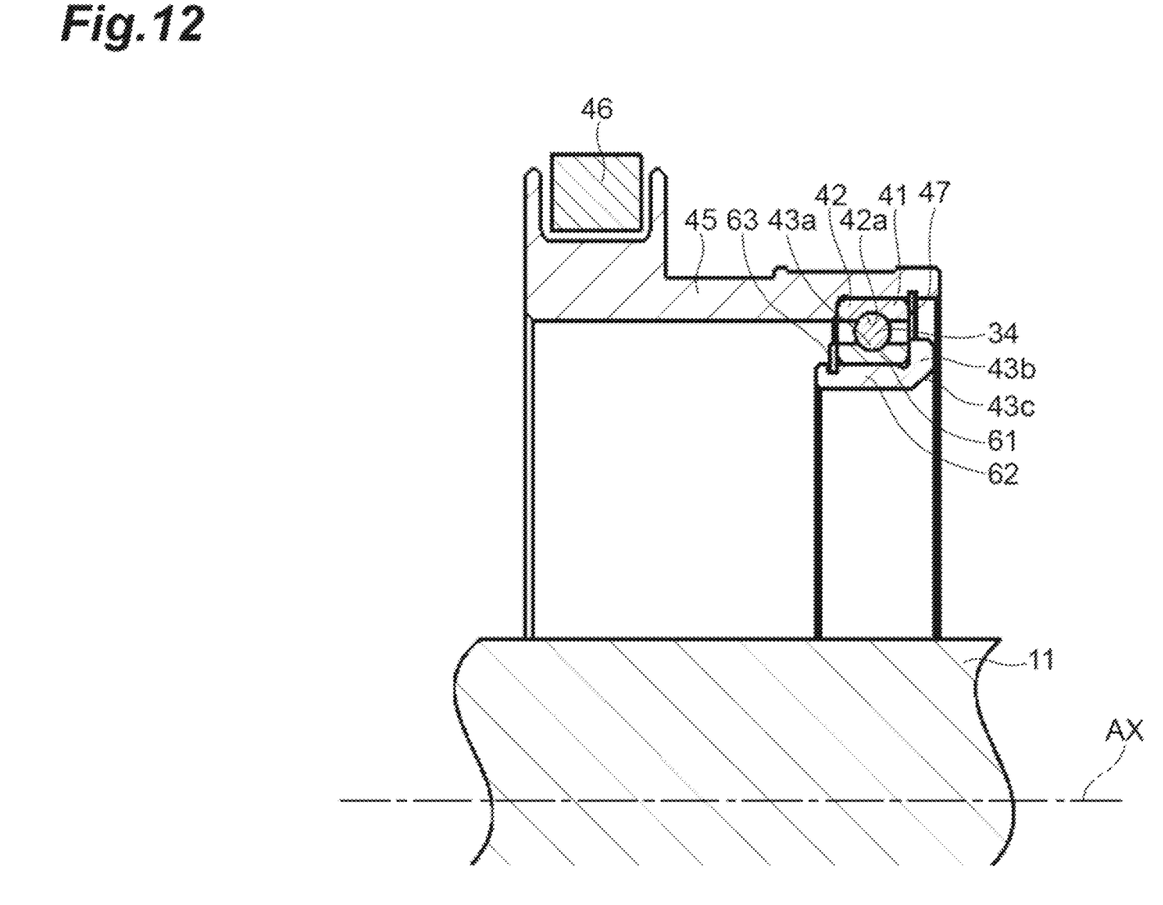
FIG. 12 is a cross-sectional view of a cam member of a second modification example.

A second modification example shown in FIG. 12 is a modification example of the cam member 41 in the clutch device 1B of the second embodiment. In the second modification example, the cam inner ring portion 43 includes an outer member 61 having the raceway surface 43a, and an inner member 62 disposed inside the outer member 61 in the radial direction to come into contact with the claw members 22. The inner member 62 includes the protruding portion 43b on which the inclined surface 43c is formed, and comes into contact with the claw members 22 at the inclined surface 43c. The outer member 61 is a member constituting a bearing together with the cam outer ring portion 42, and the inner member 62 is a cam ring that pushes down the claw members 22. In this example, a retaining ring 63 is provided opposite to the outer ring 3 of the outer member 61, and the outer member 61 is disposed between the inner member 62 and the retaining ring 63, so that the movement of the outer member 61 in the axial direction is restricted. Even in the case of using the cam member 41 of the second modification example, similarly to the second embodiment, it is possible to increase the degree of freedom in design while suppressing an increase in drag loss.

What is claimed is:
1. A clutch device comprising:
    an inner ring;
    an outer ring;
    a ratchet engagement mechanism including a notch provided on an outer peripheral portion of the inner ring, and an engaging member that is provided on an inner peripheral portion of the outer ring and that engages with the notch to restrict a rotation between the inner ring and the outer ring in one direction; and a switching mechanism that includes a cam member movable in an axial direction with respect to the inner ring and the outer ring, and that switches an engagement state of the ratchet engagement mechanism between a first state where the engaging member is engaged with the notch and a second state where the engaging member is not engaged with the notch, by causing the cam member to move in the axial direction and come into contact with the engaging member, wherein the cam member includes a cam inner ring portion provided to rotate together with the inner ring, a cam outer ring portion disposed outside the cam inner ring portion in a radial direction, and a plurality of rolling elements disposed between the cam inner ring portion and the cam outer ring portion, and the cam member moves in the axial direction to cause the cam outer ring portion to come into contact with the engaging member so as to switch the first state and the second state.

2. The clutch device according to claim 1, wherein the cam outer ring portion consists of one member.

3. A clutch device comprising:

an inner ring;

an outer ring;

a ratchet engagement mechanism including a notch provided on an inner peripheral portion of the outer ring, and an engaging member that is provided on an outer peripheral portion of the inner ring and that engages with the notch to restrict a rotation between the inner ring and the outer ring in one direction; and a switching mechanism that includes a cam member movable in an axial direction with respect to the inner ring and the outer ring, and that switches an engagement state of the ratchet engagement mechanism between a first state where the engaging member is engaged with the notch and a second state where the engaging member is not engaged with the notch, by causing the cam member to move in the axial direction and come into contact with the engaging member, wherein the cam member includes a cam outer ring portion provided to rotate together with the outer ring, a cam inner ring portion disposed inside the cam outer ring portion in the radial direction, and a plurality of rolling elements disposed between the cam inner ring portion and the cam outer ring portion, and the cam member moves in the axial direction to cause the cam inner ring portion to come into contact with the engaging member so as to switch the first state and the second state.

4. The clutch device according to claim 3, wherein the cam inner ring portion consists of one member.

* * * * *